United States Patent [19]
Kim et al.

[11] Patent Number: 5,712,342
[45] Date of Patent: Jan. 27, 1998

[54] PROCESS FOR PRODUCING A WATER-DISPERSION OF POLYURETHANE RESIN AND A PAINT COMPOSITION CONTAINING THE RESIN PRODUCED BY THAT PROCESS

[75] Inventors: Yang Bae Kim; Jong Myung Park, both of Kyunggi-do, Rep. of Korea

[73] Assignee: Korea Chemical Co., Ltd., Kyeongsangnam, Rep. of Korea

[21] Appl. No.: 578,916

[22] Filed: Dec. 27, 1995

[30] Foreign Application Priority Data

Dec. 27, 1994 [KR] Rep. of Korea .................. 37415

[51] Int. Cl.$^6$ .................. C08J 3/00; C08K 3/20; C08L 75/00
[52] U.S. Cl. .................. 524/591; 524/539; 524/839; 524/840
[58] Field of Search .................. 524/539, 839, 524/840, 591

[56] References Cited

U.S. PATENT DOCUMENTS

| | | | |
|---|---|---|---|
| 3,412,054 | 11/1968 | Milligan et al. | 524/591 |
| 3,954,899 | 5/1976 | Chang et al. | 260/849 |
| 4,314,918 | 2/1982 | Birkmeyer et al. | 260/20 |
| 4,423,179 | 12/1983 | Guagliardo | 524/539 |
| 4,812,535 | 3/1989 | Dervan et al. | 525/450 |

*Primary Examiner*—Patrick Niland
*Attorney, Agent, or Firm*—Lowe, Price, LeBlanc & Becker

[57] ABSTRACT

The present invention relates to a process for production of a water-dispersion of polyurethane resin by an organic acid-oxirane ring opening reaction and to an water-borne paint composition containing the resin made thereby, wherein said a water-dispersion of polyurethane resin is obtained by reacting polyisocyanate and the following polyols:

a) A polyol grafted with a long chain alkyl group obtained by organic acid-oxirane ring opening reaction;

b) Neutralized dimethyl alkyl acid of 0.1 to 100 milliequivalents and polyethylene glycol of 10 to 2,000 number average molecular weight as functional groups for water-dispersion of synthesized resin.

c) Polyol having at least one or more hydroxyl groups on termini and a number average molecular weight of 10 to 2,000.

The water-borne paint composition containing a water-dispersion of polyurethane resin, of the present invention, has such advantages as realizing a coating layer of rich gloss, excellence in anti-water and anti-chipping resistance, good storability and effective sprayability.

16 Claims, No Drawings

PROCESS FOR PRODUCING A WATER-DISPERSION OF POLYURETHANE RESIN AND A PAINT COMPOSITION CONTAINING THE RESIN PRODUCED BY THAT PROCESS

DETAILED DESCRIPTION OF INVENTION

The present invention relates to a process for producing a water-dispersion of polyurethane resin by reacting hydroxyl terminated prepolymer with polyisocyanate, more specifically, to a process for production of a water-borne polyurethane resin containing the long-chain alkyl group by an organic acid-oxirane ring opening reaction, and also to a paint composition containing such resin as produced by said process.

The coating with urethane brought forth a reaction of polyester and polyisocyanate has been made advantageous use of where, in especial, the coating is required to maintain its good appearance against long exposures to light and also impact from the exterior, and such paint compositions containing polyurethane as main resin are popularly used for coating bumpers and other parts as well as bodies of automobiles. Especially, coating with such polyurethane as contains fatty acid introduced into it is excellent in its gloss and distinction of image, and is, therefore, very suitable for final glazing of carbodies, which require beauty.

Introduction of fatty acid into polyurethane resin and use of this polyurethane for coating have been suggested in a few patents, and the usual processes for introduction of fatty acid into polyurethane comprise synthesizing polyhydroxy alkyd resin at a high temperature, and reacting in with polyurethane afterwards. For example, U.S. Pat. No. 3,954,899 disclosed an instance of use for painting of a composition containing polyester made by a urethane reaction, in which case the polyester was composed of either carboxylic acid having 2 to 14 monomeric carbons or anhydride thereof. More recently, a method for production of a waterborne polyurethane by using dimmer of fatty acid has been disclosed in U.S. Pat. No. 4,423,179. But these methods have problems that either the introduction of long chain is difficult or that, because they react at high temperatures, change to yellowish hue is apt to occur.

As to synthesizing a ring opening condensation product of the glycidyl ester of long chain carboxylic acid has been reported in U.S. Pat. No. 4,314,918, but no disclosure is made in this patent of a water-borne polyurethane resin obtained by a urethane reaction of hydroxyl groups at both ends, nor of a process therefor.

As contamination of environment from volatile organic solvents contained in solvent-type paints has become a serious problem, need to develop water-borne paints is all the more keenly felt.

Now the present invention is intended to provide a process for production of a water-borne paint, which can both help simplify production and meet environmental regulations by comprising a production of water-borne urethane reaction product of hydroxyl terminated polyol with a long chain alkyl group through an organic acid-oxirane ring opening reaction; and a paint composition containing said water-borne paint.

The present invention relates essentially to a water-dispersion of polyurethane resin produced by a reaction of the following polyol and polyisocyanate, and also to a paint composition which contains such resin.

a) Polyol grafted with a long-chain alkyl group, which obtained from an organic acid-oxirane ring opening reaction;

b) Neutralized dimethylol alkyl acid of 0.1 to 100 milliequivalents and polyethylene glycol with a number average molecular weight of 10 to 2,000 as water-dispersible functional groups; and, c) Polyol having at least one or more hydroxyl groups at terminal and a number average molecular weight of 100 to 2,000.

The oxirane ring opening reaction by organic acid is only a very widely known chemical reaction, and if diacid or a diglycidyl compound is used as reactant, then a hydroxyl group can be introduced into both ends of the product.

To elaborate this, a long-chain alkyl group can be introduced into polyol by reaction of glycidyl ester of fatty acid or simple fatty acid, and fatty acid and hydroxyl terminated prepolymer can be synthesized by an organic acid-oxirane ring opening reaction, which can be produced by the following two processes.

The first process comprises a reaction of a diepoxid compound with 2-equivalents of monomeric carboxylic acid; wherein, said diepoxid compound has the following composition, its hydrocarbon group is replaced by a varied group, its epoxy equivalent is from 50 to 1,000, and its molecular weight is from 100 to 2,000. Such diepoxid compounds include 2,3-bis [4-(2,3-epoxypropoxy)-phenyl] propane, 1,4-bis [(2,3-epoxypropoxy)-methyl]cyclohexane, 1,4-bis [(2,3-epoxypropoxy)-methyl]benzene, etc.

Said 2 equivalents of monomeric carboxylic acid to react with said diepoxid compound has a molecular weight of less than 500 and its acid value ranges from 110 mgKOH/g to 1000 mgKOH/g. Examples of such monomeric carboxylic acid include acetic acid, propanoic acid, butanoic acid, pentanoic acid, hexanoic acid, heptanoic acid, octanoic acid, nonanoic acid, laurylic acid, benzoic acid, linolic acid, oleic acid, crotonic acid, etc. And examples wherein an alkyl group is substituted in the α-position of monomeric acid are 2-ethyl hexyl acid and versatic acid 10 (Shell Chemicals' Product).

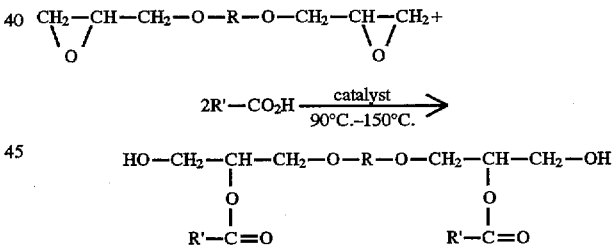

In the above formulae R stands for an alkyl group, an aromatic group substituted with alkyl group, or a cycloalkyl group, and R' stands for an alkyl group.

The molar ratio (diepoxid compound/monomeric acid) in the ring-opening condensation reaction of diepoxid by monomeric acid is 1/2. The reaction is performed at temperatures within the range from 90° C. to 150° C., and it is exothermic. As most of diepoxid compounds are in a solid form, it is preferable to use a reaction solvent of 5% to 40% to total solid to maintain a constant temperature and for control of viscosity while the reaction goes on, but as a polyurethane reaction takes place secondarily through the urethane reaction, use of a solvent containing active hydrogen like alcohol is not preferable. Preferable reaction solvents include butyl acetate, propyl acetate, methoxyproplyl acetate, ethyl acetate, methyl isobutyl ketone, methylethyl ketone, acetone, etc.

The second process comprises a reaction of a dicarboxylic acid compound and 2 equivalents glycidyl ester in which said dicarboxylic acid has a molecular weight of 50 to 800, the acid value from 140 mgKOH/g to 2000 mgKOH/g. Such dicarboxylic acids include adipic acid, sebacic acid, succinic acid, diglycolic acid, phthalic acid, isophthalic acid, fumaric acid, azelaic acid, terephthalic acid, 1,4-cyclohexane dicarboxylic acid, and mixture thereof.

The glycidyl ester reacting with said dicarboxylic acid is a compound having a molecular weight of 50 to 1,000, the epoxy equivalent 50 to 1,000. For such glycidyl ester, not merely the glycidyl ester of alkanoic acid, containing a methyl group at the α-position and having 6 to 12 carbon atoms, but glycidyl ester of normal alkanoic acid as glycidyl stearate, glycidyl oleate, etc. can also be used.

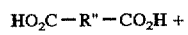

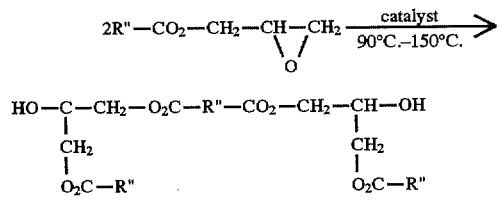

In the above formulae, R" stands for hydrocarbon having a molecular weight of 50 to 500.

The glycidyl-oxirane ring opening reaction by dicarboxylic acid according to the two processes, as described above, takes place in the presence of tertiary amine or tin or phosphorous catalyst, e.g. triphenyl phosphine, 4-dimethylamino pyridine, triethyl amine, butylstanoic acid, etc.

The polyol produced by either of the said two processes has a hydroxyl groups at both ends, the acid value being within the range from 0 to 15 mgKOH/g, this signifying that the oxirane ring-opening reaction by carboxylic acid having taken place for more than 90%. The reason why the acid value of the final resin has not become zero is that the oxirane ring-opening reaction by the hydroxyl group goes on in a side reaction. As an oxirane ring-opening reaction of a hydroxyl group generally takes place at over 150° C., the reaction needs be taken care to take place below that temperature. As the product of the reaction approaches the theoretical molecular weight according to an analysis of the reaction product by the gel permeation chromatography, the molecular weight distribution (Mw/Mn) also being indicated to be within the range of 1 to 1.2, such side reaction by a hydroxyl group notwithstanding, it is quite applicable as prepolymer for production of polyurethane.

Also, said hydroxyl terminated prepolymer, synthesized by the process described above, can be synthesized, together with other water-soluble groups, into water-soluble polymer by a urethane reaction, and the methods for water-dispersion of such polymer here include 1) a forcible one by emulsifier, 2) one by introduction of a hydrophilic non-ionic group, 3) another one by an ionic group, etc. Of these, said water-dispersion by emulsifier has a defect in that the final dry coating has only poor water-resistance quality, while water-dispersion by introduction of an ionic group into polymer has merits in that great stability is obtained at normal or high temperatures, excellent anti-weather and water-resistance as well as high tensile strength and elasticity, but at the same time has defects in that this water-dispersion stabilized by ionic groups alone is found pretty sensitive to electrolyte and low temperatures. In the meantime, water-dispersed polymer by introduction of non-ionic hydrophilic groups like polyethylene oxide remains stable against electrolyte or low temperatures also.

In the present invention it has been discovered that the water-dispersion, obtained by introduction of the neutralized salt of carboxylic acid within the range of 0.1 to 100 milliequivalents as water-dispersible functional group and polyethylene glycol of 10 to 1,000 in number average molecular weight, which is of a non-ionic hydrophilic group, is not merely not sensitive to electrolyte but keeps stable even at high or low temperatures.

The carboxylic acid which can be neutralized and turned water-borne, as is shown in the following formulae, is synthesized from aldehyde, which has two active hydrogen in the α-position, that is, easily obtainable by neutralizing it with amine. Acids applicable in the present invention include: 2,2-di(hydroxymethyl) acetic acid, 2,2,2-tri (hydroxymethyl) acetic acid, 2,2-di(hydroxymethyl) propanoic acid, 2,2-di (hydroxymethyl) acetic acid, 2,2-di (hydroxymethyl) butyl acid, 2,2-di(hydroxymethyl) pentanoic acid, etc., but preferably 2,2-di(hydroxymethyl) propanoic acid.

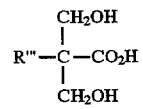

In the above formula, R'" stands for an alkyl group, amine, or an alkyl group in which the hydroxyl group is substituted.

The polyethylene glycol applicable in the present invention need have number average molecular weight of a value ranging from 10 to 2,000. More preferable is polyethylene glycol of 300 to 1,000 in number average molecular weight. Its quantity for use is 0.1 wt % to 10 wt % of the polyurethane.

Moreover, to secure the physical property required of coating material it is necessary to use hydroxyl terminated prepolymer having adequate number average molecular weight, and polyol with large number average molecular weight can also be used, preferably in a mixture with polyol of low number average molecular weight (10–2,000). In case that polyol of tow molecular weight is introduced into urethane the glass transition temperature rises, while, on the contrary, if prepolymer for low glass transition temperature but of high molecular weight is introduced, the flexibility rises. According as the ratios of these vary the anti-chipping quality and water-resistance of the layer of coating can vary. In most cases the prepolymer has two hydroxyl groups, but when a little branching is required polyol with more than two hydroxyl groups is adopted. By contrast, where polyurethane with low number average molecular weight is required a small quantity of mono alcohol can be of use. The quantity of polyol for use is 60 wt % to 90 wt % of the polyurethane. The polyols used for polyurethane include polycaprolactone diol, polycarbonate diol, cyclohexane dimethylol, hydroxyalkylated bisphenol, hydrogenated bisphenol, propylene glycol, ethylene glycol, butylene glycol, neopentyl glycol, polypropylene glycol, 1,6-hexane diol, etc. And the polyols of tri-or more hydric values include trimethylol propane, trimethylol ethane, pentaerythrytol, etc.

The polyol prepolymers, mentioned above, are reacted with diisocyanate to synthesize a polyurethane of an increased number average molecular weight. The number average molecular weight of the polyurethane depends on the different equivalent ratios of the polyisocyanate and polyol used, and the OH/NCO equivalent ratio of the above polyurethane is 0.5 to 1.8.

On the other hand, the rise in viscosity on account of the rise in the molecular weight during the reaction of isocyanate and urethane needs to be controlled, and the most representative methods for this control of the rise in viscosity include: 1) an acetone process, 2) an NMP (N-methyl-2-pyrrolidinone) process, and 3) a process for raise of the molecular weight by polyamines after dispersion in excessive isocyanate. In the acetone process above it requires vacuum distillation of acetone after water-dispersion, the NMP process has a defect in that NMP may remain in the layer of painting after coating to unfavourably affect the physical property, while the last-mentioned process has a defect in that the process is itself complicated. To the production process for resin in the present invention all these three processes can possibly be applied.

Urethane reaction is performed in the presence of amine and tin catalysts at 50° C. to 100° C. The catalysts preferable in a urethane reaction include triethylene diamine, molphorine, N-ethylmolphorine, piperazine, triethanol amine, triethylamine, dibutyltindilaurate, steniusoctanoate, dioctyltindiacetate, redoctanoate, speniusoleate, dibutyltinoxide, etc.

The organic diisocyanate used in the reaction is essentially diisocyanate, such as hydrocarbon diisocyanate, substituted hydrocarbon diisocyanate, etc. Many kinds of diisocyanate are known such as, for example, paraphenylendiisocyanate, biphenyl 4, 4'-diisocyanate, toluene diisocyanate, 3, 3'-dimethyl-4, 4'-biphenylen diisocyanate, 1,6-hexamethylene diisocyanate, 2,2,4-trimethylene-1,6-diisocyanate, 1,4-tetramethylen diisocyanate, isophorone diisocyanate (IPDI), methylene-bis-(4-cyclohexyl isocyanate), meta-tetramethylxylene diisocyanate, etc.

The carboxylic acids introduced into the produced polyurethane are neutralized or rendered water-borne by addition of neutralizer or flow control agent so that 0.1 to 120, preferably 1 to 70 milliequivalents of salt per 100 gram of solid component can be produced. The milliequivalent of neutralized resin affects the viscosity of the water-dispersion and the size of its particles. Generally, in similar circumstances, the higher the degree of neutralization the viscosity rises, the size of the particles brecomes smaller. The water-borne resin of the present invention is of 5 wt % to 70 wt % to the total solid component.

As the amine for use in the present invention one or more are selected from the group consisted of ammonia, triethyl amine, diethanol amine, N,N-dimethylethanol amine, 2-amino-2-methyl-1-propanol, N,N-diethyl ethanol amine, 2-dimethyl amino-2-methyl-1-propanol, monoisopropanol amine, triisopropanol amine, tributyl amine, monoethanol amine, triethanol amine, N-ethyldiethanol amine, N-methyl diethanol amine and morphine, and one or more of these are used in a proportion of 0.5 wt % to 5 wt % to the polyurethane resin. Calculation of the quantity of amine is done as follows:

$$\frac{\text{Solid component of resin (g)} \times \text{acid value} \times \text{degree of neutralization} \times \text{molecular weight of amine}}{56100} = \text{The quantity of amine.}$$

The aforesaid flow control agent is added by about 1 wt % to 10 wt % to the total resin during the neutralization reaction in order to restrain the rise of viscosity of the resin and facilitate the production process, the representative solvents here including methylethylketone, acetone, butylcellosolve, butylcarbitol, isopropanol, dimethylformamide, glycoldiester, phlorinatedihydrocarbon, N-methyl-2-pyrrolidone, hydrogenated furan, etc.

The paint composition in the present invention is produced by mixing the polyurethane polymer produced in a way described above and aminoplast resin. This aminoplast resin, being a condensation product of melamine, urea, or similar compounds and aldehyde is represented by the following formula. As aminoplast resin, reacted compounds of melamine, urea, or benzoguanine and formaldehyde are generally used. These hardeners are also used in the present invention.

CH2OR""
N
CH2OR""

In the above formula, R"" stands for hydrogen or an alkyl group.

Representative aminoplasts include Cymel 303, 305, 327, 1116, and 1123 (Cytec Company), Marprenal MF 904, 900, 920 (Hoechst Company), Resimen 714, 717, 730 (Monsanto), etc. These hardeners are used by 10 wt % to 40 wt % to the polyurethane resin. If the quantity of hardener is lower than 10 wt %, the crosslinkage decreases, the layer of coating accordingly softening to detract from the adhesiveness and chemical resistance, while if it is over 40 wt % the layer of coating hardens to detract from such mechanical strength as impact-absorption and bendability, and the gloss, possibly causing a rapid rise of viscosity of the paint when it is in stock. In order for a paint containing aminoplast hardener to harden at appropriate temperatures a hardening catalyst is required including, for instance, weak acid or strong acid, either to be chosen according to its special properties, and generally carboxylic acid is used as the weak acid catalyst, and paratoluene sulfonic acid for the strong acid catalyst.

The different ratios of components in the aforesaid composition do not merely result in different physical properties of the layer of the final coating but affect its stability while in stock. The applied ratio of components relies a great deal on the special natures of such components as polyester, aminoplast resin, polymeric polyol, etc. In most cases the composition comprises 60% to 90% of a urethane reaction product and 10% to 40% of aminoplast resin, and the urethane reaction product contains polymeric polyol by 20% to 90%.

Besides the aforesaid components, many kinds of pigments, namely, any pigments utilized in automotive paints, can generally be used, and in the present invention such pigments as, for example, titanium oxide, zinc oxide, metal hydroxide, metal flake, cromate, red silica, talc, china clay, organic dye, red blue, iron blue, organic red, mica, etc. all by 0.1 wt % to 60 wt % to the total paint composition. Also, many kinds of fillers, plasticizers, anti-oxidants, flow control agents, dispersion agents, anti-foaming agent, levelling agents etc. are used as other additives, by 0.1 wt % to 8 wt % to the total water-borne paint composition.

The paint composition produced in the present invention can be applied by any conventional method, including brushing, dipping, flow coating, etc. but as spraying is adopted for coating cars it can also be used by usual spraying techniques and equipment. Also, the paint compositions can be applied on varied substrates including wood, metals, glass, fibre, plastic, etc.

The paint compositions, after coating are cured at elevated temperatures, in most cases at 100° C. to 170° C. for 20 to 40 minutes. If necessary, acid catalysts or other curing catalysts are used for the curing to take place at lower temperatures, in shorter time.

Below, the present invention is described in further detail in connection with examples, but it should not be interpreted that the present invention is confined to these examples.

EXAMPLE 1

The reaction vessel, equipped with a stirrer, thermometer, nitrogen injection tube, and reflux condenser, was charged with the following components:

| Components | Parts by weight |
| --- | --- |
| 2,3-bis[4-(2,3-epoxypropoxy)-phenyl]propane | 340.0 |
| Edner V85KR[1] | 294.0 |
| Butyl acetate | 80.0 |
| Triphenylphosphine | 0.1 |

[1] 'Interharz' product

The above mixture was heated to 140° C. in a nitrogen atmosphere, and retained for two hours thereafter. The acid value after completion of the reaction was 9.8 mgKOH/g, and the number average molecular weight by the gel permeation chromatography (Water's 150 CV model) was 800. The molecular weight distribution Mw/Mn was 1.1.

EXAMPLE 2

The reaction vessel, equipped with a stirrer, thermometer, nitrogen injection tube, and reflux condenser, was charged with the following components.

| Components | Parts by weight |
| --- | --- |
| 1,4-cyclohexanedicarboxylic acid | 57.4 |
| Kadura E-10[1] | 167.0 |
| Butyl acetate | 30.0 |
| Triphenylphosphine | 0.1 |

[1] Shell Chemicals' product

In a similar manner as in Example 1 the above mixture was heated to 140° C. in a nitrogen atmosphere, and was retained for two hours thereafter. As the reaction went on, cyclohexanediacid, the solid matter, began to be melted. The acid value after completion of the reaction was 7.3 mgKOH/g, and the number average molecular weight 777 by the gel permeation chromatography (Water's 5 150 CV model). The molecular weight distribution Mw/Mn was 1.12.

EXAMPLE 3

The polyurethane water-dispersion was produced by urethane reaction making use of the prepolymer made by Example 1 above, as follows:

| Components | Parts by weight |
| --- | --- |
| Prepolymer (Example 1) | 235.0 |
| Dimethylolpropionic acid | 23.0 |
| Polycarbonate diol (M.W. = 1,000) | 334.0 |
| Isophorondiisocyanate | 184.0 |
| Polyethyleneglycol (M.W. = 300) | 50.1 |
| Acetone | 500.0 |
| Dibutyltindilaurate | 1.0 |

The above components were all mixed and the mixture heated at 80° C. Then it was retained for about 14 hours until its isocyanate value gets to 0, and then it was neutralized by addition of dimethylethanolamine by 13.8 parts by weight. Then distilled water by 1,500 parts by weight was added while stirring at high speed, and by this the water-dispersion was obtained. The water-dispersion thus produced was vacuum distilled, whereby removing acetone, the solvent. The number average molecular weight of the thus produced polyurethane was 2,983, and the molecular weight distribution Mw/Mn 2.68. The particle size in the water-dispersion was 110 nanometer (Malberon autosizer), its pH value 6.8, and the total solid content coming to 39.8%.

EXAMPLE 4

Polyurethane water-dispersion was produced with the use of the prepolymer produced in Example 1, as follows:

| Components | Parts by weight |
| --- | --- |
| Prepolymer (Example 1) | 235.0 |
| Dimethylolpropionic acid | 23.0 |
| Polycarbonate diol (M.W = 1,000) | 334.0 |
| Isophorondiisocyanate | 221.4 |
| Polyethyleneglycol (M.W. = 300) | 50.1 |
| Polycaprolactone diol (M.W. = 850) | 141.0 |
| Acetone | 500.0 |
| Dibutyltindilaurate | 0.6 |

The above components were mixed by a similar process to that in Example 3 and heated at 80° C. The mixture was maintained for about 12 hours until its isocyanate value was reduced 0, then dimethylethanol amine by 15 parts by weight was added thereto for neutralization, and later on acetone was vacuum distilled. The number average molecular weight of the polyurethane thus produced was 3325, the molecular weight distribution Mw/Mn, 2.97. A water-dispersion with the particle size by 123 nanometer was thus obtained.

EXAMPLE 5

Polyurethane water-dispersion was produced with the use of the prepolymer produced in Example 1, as follows:

| Components | Parts by weight |
| --- | --- |
| Prepolymer (Example 1) | 211.0 |
| Dimethylolpropionic acid | 23.0 |
| Polycarbonate diol (M.W. = 1,000) | 334.0 |
| Isophorone diisocyanate | 221.4 |
| Polyethyleneglycol (M.W. = 300) | 50.1 |
| Cyclohexane-1,4-dimethylol | 24.0 |
| Acetone | 300.0 |
| Dibutyltindilaurate | 0.6 |

The above components were all mixed by a similar process to that in Example 3 and heated at 80° C. The mixture was maintained for about 12 hours till its isocyanate value became 0, and then dimethylethanol amine by parts by weight was added thereto to neutralize all, and acetone was vacuum distilled. The number average molecular weight of the polyurethane thus produced was 2,750, the molecular weight distribution Mw/Mn, 2.71. Thus a water-dispersion with the particle size of 110 nanometer was obtained.

EXAMPLE 6

Polyurethane water-dispersion was produced with the use of the prepolymer produced in Example 2, as follows:

| Components | Parts by weight |
| --- | --- |
| Prepolymer (Example 2) | 254.0 |
| Dimethylolpropionic acid | 23.0 |
| Polycarbonate diol (M.W. = 1,000) | 334.0 |
| Isophorondiisocyanate | 184.0 |
| Polyethyleneglycol (M.W. = 300) | 50.1 |
| Acetone | 500.0 |
| Dibutyltindilaurate | 1.0 |

The above components were mixed by a process similar to that in Example 3 and heated at 80° C. The mixture was maintained for about 12 hours until its isocyanate value was reduced to 0, then dimethanol amine by 15 parts by weight was added thereto for neutralization, and acetone was vacuum distilled. Thus a water-dispersion with the particle size of 80 nanometer was obtained.

EXAMPLE 7

Polyurethane water-dispersion was produced with the use of the prepolymer produced in Example 2, as follows:

| Components | Parts by weight |
| --- | --- |
| Prepolymer (Example 2) | 235.0 |
| Dimethylolpropionic acid | 23.0 |
| Polycarbonate diol (M.W. = 1,000) | 334.0 |
| Isophorondiisocyanate | 221.4 |
| Polyethyleneglycol (M.W. = 300) | 50.1 |
| Polycaprolactone diol (M.W. = 850) | 141.0 |
| Acetone | 300.0 |
| Dibutyltindilaurate | 0.6 |

The above components were mixed by a process similar to that in Example 3 and heated at 80° C. The mixture was maintained for about 12 hours until its isocyanate value was reduced to 0, dimetylethanol amine by 15 parts by weight was added thereto for neutralization, and acetone was vacuum distilled. The number average molecular weight of the polyurethane thus produced was 3,210, the molecular weight distribution Mw/Mn, 2.83. Thus a water-dispersion with the particle size 123 nanometer was obtained.

EXAMPLE 8

Paint was produced with the use of the polyurethane water-dispersion produced in the above. After production of pigment paste with the use of part of the resin for dispersion, main resin, hardening agent, additives, etc. were added, thus producing paint.

| Mill base | Parts by weight |
| --- | --- |
| Resin of Example 3 | 18.7 |
| Efca-453[1] | 10.0 |
| AMP-95[2] | 0.82 |
| 2-butylethanol | 2.0 |
| Efca 27[3] | 0.5 |
| Dimethylethanol 10% solution (distilled water) | 2.0 |
| Blue A3R[4] | 25.0 |
| Distilled water | 40.98 |

[1] Efca Company's dispersant
[2] Angers Company's pH controlling agent
[3] Efca Company's defoamer
[4] Ciba-Geigy Chem. Corp.'s blue pigment Using the above components a pigment paste was produced with the use of red devil in two hours.

| Final stage | Parts by weight |
| --- | --- |
| Example 3 | 19.0 |
| Cymel 325[1] | 5.0 |
| 2-buthoxy-ethanol | 2.75 |
| 2-ethoxy-1-hexanol | 0.86 |
| Butylcarbidol | 1.72 |
| Bermodol PUR2100 (50%)[2] | 0.45 |
| TT 935 (50% water solution)[3] | 2.6 |
| Mill Base | 35.0 |
| Distilled water | 31.52 |

[1] Cytec Company's amino resin
[2] Laco Company's thickening agent
[3] Rohm & Haas Company's thickening agent The above components were all mixed at slow speed, and the viscosity was adjusted with distilled water so as to make 35 to 40 by the Ford cup No. 4 viscometer. A metal test piece was coated with the product with spray (the layer of coating: 30 micron) and the metal piece was baked in an oven at 150° C. for 30 minutes.

EXAMPLE 9

Performed by the same process as in Example 8 except that the resin from Example 4 was used as the resin containing a long chain alkyl group. A test piece coated with the paint was produced thereby.

EXAMPLE 10

Performed by the same process as in Example 8 except that the resin from Example 5 was used as the resin containing a long chain alkyl group. A test piece coated with the paint was produced thereby.

EXAMPLE 11

Performed by the same process as in Example 8 except that the resin from Example 6 was used as the resin containing a long chain alkyl group. A test piece coated with the paint was produced thereby.

EXAMPLE 12

Performed by the same process as in Example 8 except that the resin from Example 7 was used as the resin containing a long chain alkyl group. A test piece coated with the paint was produced thereby.

The layers of coating from Examples 8 to 12 above were tested to obtain results of such physical properties as given in Table 1 below:

| | Division | | | | |
| --- | --- | --- | --- | --- | --- |
| Item | Exmpl 8 | Exmpl 9 | Exmpl 10 | Exmpl 11 | Exmpl 12 |
| Spray performance Facility | G | G | G | G | G |
| Cratering | G | A | G | A | P |
| Gloss (60°) | 67 | 65 | 60 | 63 | 68 |
| Pencil hardness | B | B | H | B | 4B |
| Adhesiveness | F | E | E | G | P |
| Water resistance | A | G | G | P | A |
| Salt spray test | A | G | E | A | G |
| Accelerated weatherability | G | G | G | G | G |
| Chipping | G | E | E | G | P |
| Storability of paint | G | G | E | G | G |

B: excellent, G: good, A: average, P: poor

Spray performance facility: requiring a dry layer of coating with a thickness of over 30 micron and still smooth and even to be obtained Cratering: within two/300×30 mm Water resistance; no extraordinary phenomenon to be detected, when left alone for one hour after soaking in water at 40° C. for 240 hours Salt spray test: no swell or rust to be detected at 3 mm crosscuts, after spray for 480 hours Storability of paint; change of viscosity within 15% at room temperature, after having been left at 50° C. for 72 hours The water-borne paint composition produced by the present invention had a high degree of gloss when it formed a layer of coating, its water resistance and anti-chipping feature excellent. The storability of this paint was excellent, and so was its sprayability.

We claim:

1. A process for production of a water-dispersion of polyurethane resin, which comprises reacting polyisocyanate with the following polyols:
   a) polyol grafted with a long chain alkyl group obtained by an organic acid-oxirane ring opening reaction;
   b) neutralized dimethylol alkyl acid of 0.1 to 100 millequivalents and polyethyleneglycol having a number average molecular weight of 300 to 2,000 as a water-dispersible functional groups;
   c) polyol having at least one or more hydroxyl groups at a terminus, and having a number average molecular weight of 62 to 2000.

2. A process of claim 1, wherein the polyol grafted with a long chain alkyl group is produced by reacting either a diepoxide compound with 2 equivalents of monomeric carboxylic acid, or a dicarboxylic acid compound with 2 equivalents of glycidyl ester in the presence of a catalyst.

3. A process of claim 2, wherein the diepoxide compound has an epoxy equivalent of 50 to 1,000 and a molecular weight of from 100 to 2,000.

4. A process of claim 2, wherein the 2 equivalents of monomeric carboxylic acid has a molecular weight of below 500 and an acid value of 110 to 1000 mgKOH/g.

5. A process of claim 2, wherein the dicarboxylic acid has a molecular weight of 50 to 800, and an acid value of 140 to 2000 mgKOH/g.

6. A process of claim 2, wherein the glycidylester has an epoxy equivalent of 50 to 1,000 and a molecular weight of 50 to 1,000.

7. A process of claim 1, wherein the neutralized dimethylol alkyl acid is a compound represented by the formula given below, synthesized from aldehydes having at least two or more active hydrogens, and neutralized with amine:

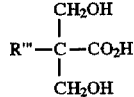

Where, R''' is alkyl group, or alkyl group substituted with the amine or hydroxyl group.

8. A process of claim 1, wherein the polyol having a number average molecular weight of 62 to 2,000 is used in an amount of 60 wt % to 90 wt % of polyurethane.

9. A process of claim 1, wherein the polyurethane has an equivalent ratio OH/NCO of 0.5 to 1.8.

10. A process of claim 1, wherein a neutralizer and a flow control agent are added and the total amount of the solid component in the produced water-dispersion of polyurethane resin is 5 wt % to 70 wt %.

11. A process of claim 10, wherein the neutralizer is one or more selected from the group consisted of ammonia, triethyl amine, diethanol amine, 2-amino-2-methyl-1-propanol, N, N-diethylethanol amine, 2-dimethylamino-2-methyl-1-propanol, monoisopropanolamine, triisopropanolamine, monoethanolamine, N-ethyldiethanolamine, N, N-dimethylethanolamine, triethanolamine, tributylamine, N-methyl diethanolamine and morphine, and one or more of these are used in a quantity of 0.5 wt % to 5 wt % of the polyurethane resin.

12. A process of claim 10, wherein the flow control agent is methylethylketone, acetone, butylcellosolve, butylcarbitol, isopropanol, dimethylformamide, glycoldiester, fluorinate dihydrocarbon, N-methyl-2-pyrrolidone, or hydrogenated furan.

13. An water-borne paint composition comprising a water-dispersion of polyurethane resin obtained by one of claim 1 above, amino resin, pigment and other additives.

14. An water-borne paint composition of claim 13, wherein the amino resin is represented by the following formula and used in a quantity of 10 wt % to 40 wt % of solid component of the polyurethane resin

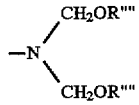

Where, R'" represents hydrogen or alkyl group.

15. An water-borne paint composition of claim 13, wherein the additives are fillers, plasticizers, flow control agents, dispersion agents, anti-foaming agents or levelling agents, and these are used in a quantity of 0.1 wt % to 8 wt % of the total composition.

16. An water-borne paint composition of claim 13, wherein the pigment is titanium oxide, zinc oxide, methylhydroxide, metal flake, cromate, red silica, talc, china clay, organic dye, red blue, iron blue, organic red, mica, or a mixture of any of these, and its quantity to be used in the range of 0.1 wt % to 60 wt % of the total composition.

* * * * *